United States Patent
Tibbetts et al.

[11] Patent Number: 5,127,818
[45] Date of Patent: Jul. 7, 1992

[54] APPARATUS FOR EXTENDING CONTOUR GASKETS

[75] Inventors: Robert Tibbetts, Alton; Stuart Kaiser, Brookfield, both of N.H.

[73] Assignee: Davidson Textron Inc., Dover, N.H.

[21] Appl. No.: 597,200

[22] Filed: Oct. 10, 1990

[51] Int. Cl.⁵ .............................................. B29C 41/00
[52] U.S. Cl. ................................... 425/435; 249/137; 264/302; 264/310; 425/DIG. 47
[58] Field of Search ............... 264/301, 302, 310, 311; 425/435, DIG. 47; 249/137

[56] References Cited

U.S. PATENT DOCUMENTS 4,790,510 12/1988 Takamatsu et al. ................. 264/302

FOREIGN PATENT DOCUMENTS 62-144913 6/1987 Japan .................... 264/302

Primary Examiner—Jay H. Woo
Assistant Examiner—C. Scott Bushey
Attorney, Agent, or Firm—Reising, Ethington, Barnard, Perry & Milton

[57] ABSTRACT

An apparatus (10) for molding a thin-wall plastic shell includes a powder box (12) and a mold box (14). The powder box (12) is positioned to an operative position wherein an opening (18) in the powder box (12) is brought in proximity to the mold surface (20) of the mold. A bellows member (34) having a gasket (42) about the end thereof is extended from the opening (18) to perfect a sealed passageway between the opening (18) and the periphery (22) of the mold surface (20).

6 Claims, 2 Drawing Sheets

APPARATUS FOR EXTENDING CONTOUR GASKETS

TECHNICAL FIELD

The present invention relates to an apparatus and method for molding a thin-wall plastic shell. More particularly, the present invention relates to a molding apparatus and method utilizing a powder box and mold box wherein the mold box has a deeply recessed mold surface.

BACKGROUND ART

In processes for molding thin-walled plastic shells, a resin material is fed through an opening in a powder box to a mold surface of a mold box. Generally, the mold box and powder box are operatively connected such that the mold surface of the mold box is brought into close proximity of the opening in the powder box. The resin material is fed over the mold surface of the heated mold box and is melted into a molten resin film. The film is cooled to obtain the thin-walled plastic shell and is removed from the mold surface.

Currently, this molding process is accomplished with the powder box and mold box sealing where the two units meet; that is, at the top of the liner about the opening of the powder box and near the termination of the run off of the mold surface. This process allows the powder resin to contact the surface areas of the mold where such contact is not desired, causing waste and necessitating trimming of the finally formed part. Other methods known in the art of blocking this exposure, such as by using various insulating materials on the mold surface, still pose the problem of having to adopt special impacting and/or cooling, and/or brushing methods to keep them clean.

For example, the U.S. Pat. No. 4,790,510 to Takamatsu et al, issued Dec. 13, 1988, discloses a slush mold apparatus and method for molding film moldings such as surface coverings of interior parts of automotive vehicles. The powder box includes a skirt portion connected thereto having a lower edge which contacts the mold surface about its periphery. The skirt is a solid member which must be uniquely adapted to each unique mold surface configuration.

The present invention provides an apparatus and method for sealing at the mold about the actual periphery of the thin-wall shell which is made. Accordingly, the present apparatus and method generate little or no waste and trimming is reduced. Further, the present invention provides an apparatus and method for providing such a seal between the opening of the powder box and the periphery of the mold surface which can project into deep molds that cannot be reached by powder box elevation travel. Such deep mold surfaces can be cut into a mold box such that common mold box peripheries cannot extend into the mold surface to contact the periphery of the mold surface about the shell to be formed. The present invention provides an apparatus and method for perfecting such a seal in deep molds as well as in more shallow molds. Such a device can be adapted for both deep and shallow molds such that a single device is not limited to either the deep or shallow mold use.

SUMMARY OF THE INVENTION

In accordance with the present invention there is provided an apparatus for molding a thin-wall plastic shell including a powder box having an opening for receiving and removing powder therefrom and a mold box including a mold surface having a predetermined outer periphery thereabout over which a plastic shell is molded. Positioning means position either of the mold box and powder box between a neutral position wherein the opening is displaced from the mold surface and an operative position wherein the opening and the mold surface are positioned in proximity to each other. Extendable sealing means disposed about the opening collapses to a retracted position adjacent the opening and extends to an extended position in sealed engagement with the periphery of the mold surface and perfects a sealed passageway between the opening and the periphery of the mold surface.

The present invention further provides a process for manufacturing a thin-walled plastic shell, the method including the steps of positioning a mold surface having a predetermined outer periphery and an opening of a powder box containing powdered resin therein from a neutral position wherein the opening is displaced from the mold surface to an operative position wherein the opening and mold surface are in proximity to each other. A bellows is positioned from a collapsed position about the opening to an extended position in sealed engagement with the periphery of the mold surface. A sealed passageway is perfected between the opening and the periphery of the mold surface. A part is molded from the resin on the mold surface and the bellows is retracted back to the collapsed condition. The molded part is removed from the mold surface.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
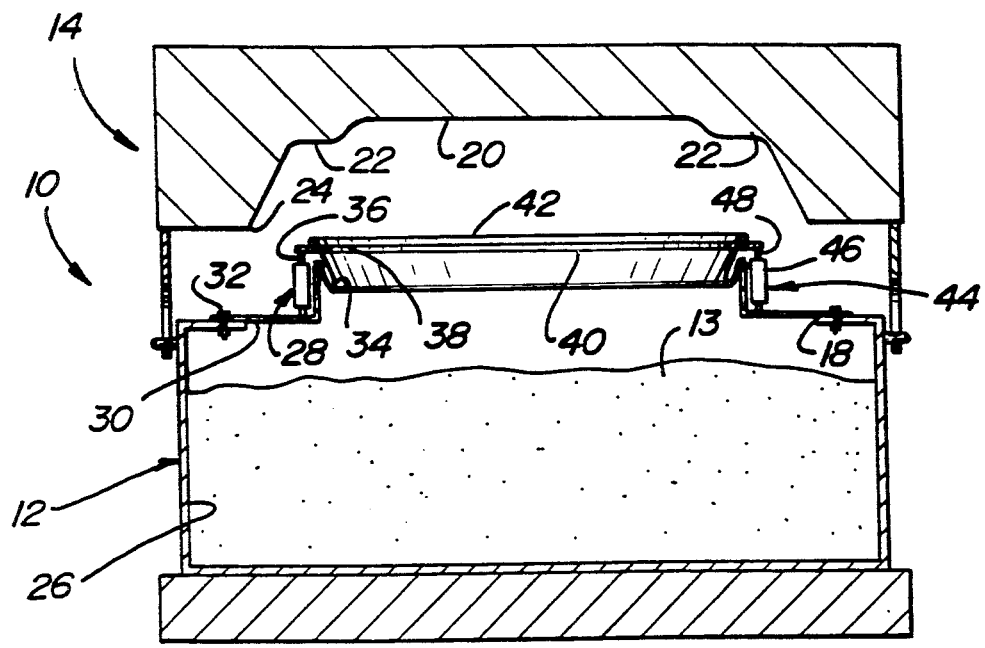
FIG. 1 is a cross sectional view of an apparatus constructed in accordance with the present invention wherein the extendable sealing means is in the retracted position.

An apparatus for molding a thin-wall plastic shell constructed in accordance with the present invention is generally shown at 10 in the Figures. The apparatus 10 generally includes a powder box generally shown at 12 containing a powder resin 13 therein and a mold box generally shown at 14. The powder box 12 and mold box 14 are clamped together by suitable means well known in the art.

An alignment mechanism 16 of the type well known in the art would be used to align an opening 18 in the mold box 12 with a mold surface 20 of the mold box 14.

Figure 2:
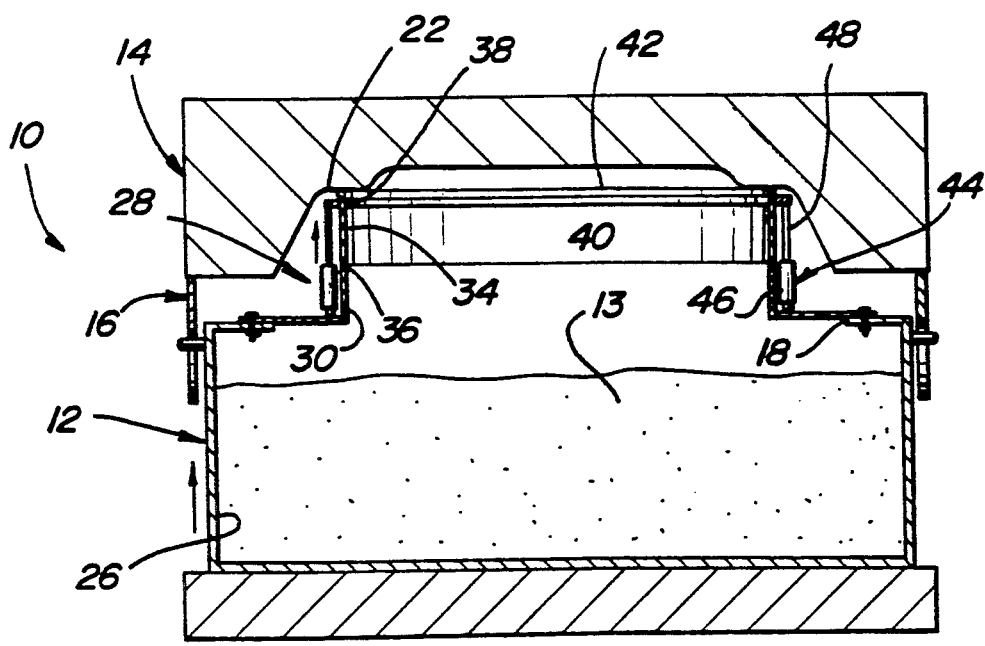
FIG. 2 is a cross sectional view of an apparatus constructed in accordance with the present invention wherein the extendable sealing means is extended to the extended position in sealed engagement with the periphery of the mold surface of the mold box.

The alignment is accomplished as the powder box 12 is elevated from a neutral position, as shown in FIG. 1 wherein the opening 18 and mold surface 20 are displaced from each other to an operative position as shown in FIG. 2 wherein the opening 18 and mold surface 20 are positioned in proximity to each other. Such means for positioning the powder box 12 can be in the form of an elevator commonly used in the art. Alternatively, the mold box 14 can be a moveable member positioned relative to a fixed powder box 12.

The mold surface 20 can be an electroform of nickel composition having suitable thermal conductivity as is well known in the art. The mold surface 20 defines the shape of the part to be molded. As shown in the Figures, the mold surface is a deeply recessed mold surface wherein a molded part 21 would have a periphery, for example at 22, which is recessed inwardly and recessed into the mold 14 relative to the actual periphery 24 of the mold surface 20 as shown in FIG. 1. In other words, the predetermined periphery 22 of the part 21 to be molded is spaced from the actual periphery 24 of the mold surface. During a molding operation, if the mold box 14 and powder box 12 are brought into close proximity, the opening 18 would still be spaced from the periphery 22 of the part 21 to be molded.

The mold assembly 10 is of the type for molding a thin-wall plastic shell 21 from a thermoplastic powder. To achieve this end, the powder box 12 includes an inner chamber 26 for containing the powder thermoplastic resin 13 therein.

Figure 3:
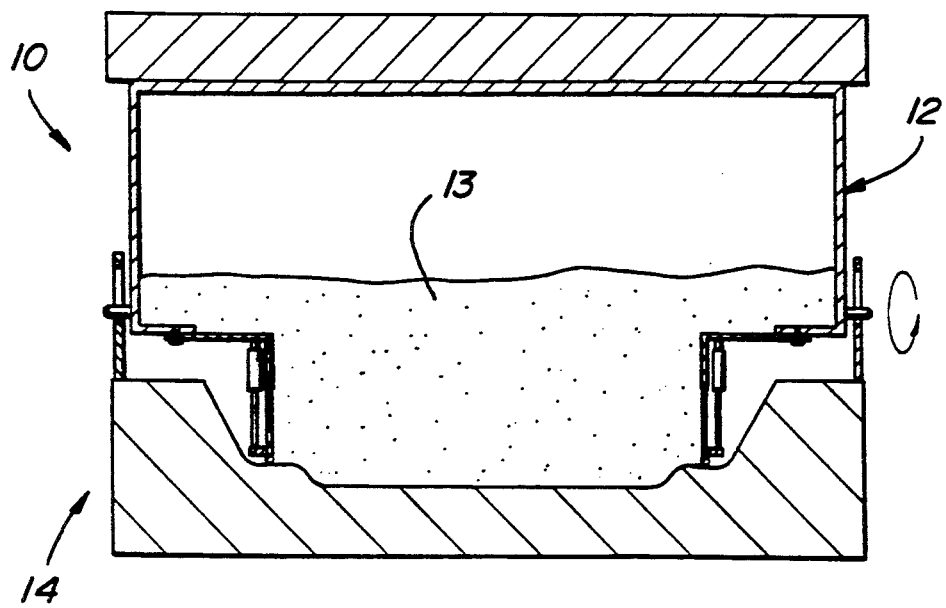
FIG. 3 is a cross sectional view of the connected apparatus rotated to expose the powdered resin to the mold surface.
Figure 4:
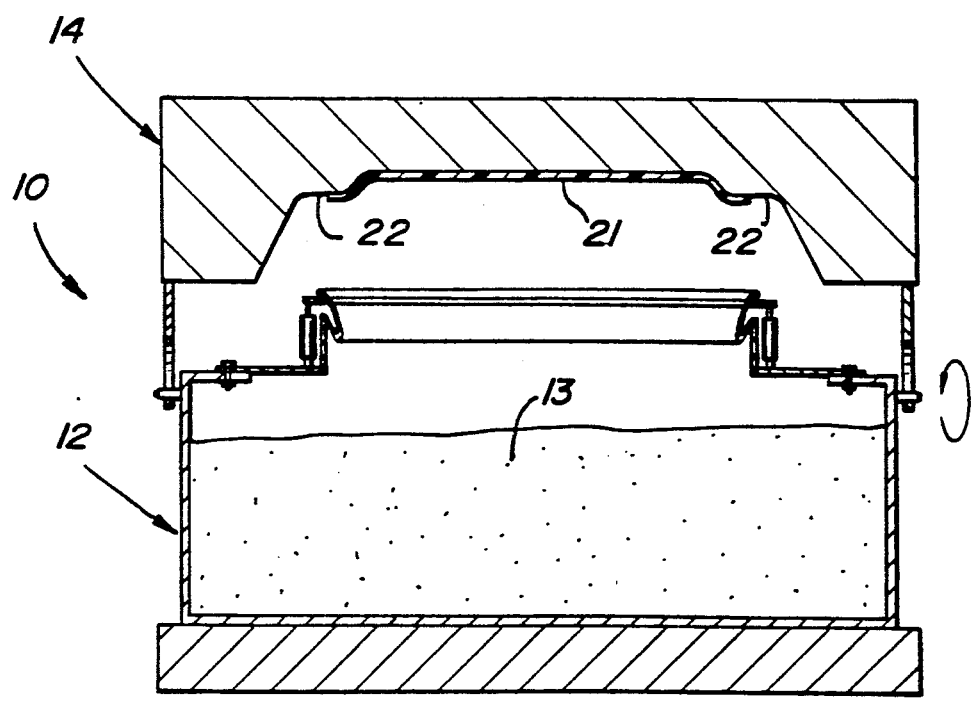
FIG. 4 is a cross sectional view of the connected apparatus returned to the origianl position having a part molded thereon.

Generally, the invention includes extendable sealing means generally indicated at 28 disposed about the opening 18 for collapsing to a retracted position adjacent the opening 18, as shown in FIG. 1 and extending to an extended position in sealed engagement with the periphery 22 of the mold surface 20 and perfecting a sealed passageway between the opening 18 and the periphery 22 of the mold surface 20 as shown in FIGS. 2-4. More specifically, a support member 30 is connected to the powder box 12 by connecting bolts 32. The connection between the support member 30 and powder box 12 perfects a seal therebetween to prevent any loss of powdered resin therethrough. A bellows member 34 has a first open end 36 in sealed connection with the support member 30 and a second end 38 having a frame member 40 mounted thereon and a gasket member 42 supported by the frame 40 for perfecting a seal against the periphery 22 of the mold surface 20 when in engagement therewith.

The gasket 42 is held in shape by the frame member 40 and is extended and positioned against the mold surface 20 after the powder box 12 is elevated. As shown in FIGS. 2-4, this extension of the bellows member 34 is necessary when the powder box travel is not sufficient to engage the gasket 42 which would otherwise be disposed about the opening 18 against the periphery 22 of the mold surface 20.

The bellows member 34 can consist of a flexible material which collapsed during retraction becomes capable of retaining powder within the chamber formed thereby when extended. The bellows member 34 can be made from a pleated material or can take on be in the form of an extendable hood or various other forms.

The assembly 10 further includes means for extending and retracting the second end 38 of the bellows member 34 between the extended and retracted positions. This extending means includes a plurality of cylinder members generally indicated at 44 comprising a housing 46 and a piston disposed therein. The piston can be hydraulically or otherwise pneumatically actuated to reciprocate relative to the housing 46. A rod member 48 is operatively connected to the piston and extends from the housing 46. The housing 46 is fixedly connected to the support member 30 thereby operatively connecting the housing 46 to the powder box 12. The rod member 48 has an end portion connected to the second end 38 of the bellows member 34 such that extension of the rod member 48 from the housing 46 moves the bellows member 34 to the extended position and retraction of the rod member 48 into the housing 46 returns the bellows member 34 to the retracted neutral position.

The process of utilizing the present invention for manufacturing a thin-wall plastic shell generally includes the steps of positioning the mold surface 20 having the predetermined outer periphery 22 corresponding to the outer periphery of the shell 21 to be formed and the opening 18 of the powder box 12 containing the powdered resin therein from a neutral position as shown in FIG. 1 wherein the opening 18 is displaced from the mold surface 20 to an operative position as shown in FIGS. 2-3 wherein the opening 18 and mold surface 20 are in proximity to each other. The bellows member 34 is extended from the collapsed condition shown in FIG. 1 about the opening 18 to an extended position as shown in FIGS. 2-4 in sealed engagement with the periphery 22 of the mold surface 20 and perfecting a sealed passageway 44 between the opening 18 and the periphery 22 of the mold surface 20. The powder box 12 and mold 14 are clamped together by means well known in the art. As shown in FIG. 3, the apparatus 10 is rotated so that the plastisol powder within the powder box 12 is distributed into the mold 14 and evenly over the mold surface 20 by gravity flow. The heated mold surface 20 transforms the powder plastisol into the thin-wall shell member 21. The mold apparatus 10 is once again rotated back to the original position as shown in FIG. 4. The bellows member 34 is retracted back to the collapsed condition and the molded part 21 is removed from the mold surface 20.

Unlike prior art assemblies, very little if any trimming of the part 21 is required because the powder from the powder box is only disposed over the portion of the mold surface 20 defined by the periphery 22 which corresponds exactly to the extent of the part to be formed. Unlike prior art fixed walled assemblies, the present invention can be adapted so as to be usable with several molds having varying depths as the bellows member 34 can be extended to different extents depending upon the amount of extension of the rod member 48 from the housing 46. Thus, the present invention provides a sealed chamber which can project into deep molds that cannot be reached by conventional powder box elevation travel.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. Apparatus (10) for molding a thin-walled plastic shell, said apparatus (10) including a powder box (12) including an opening (18) for receiving and removing powder therefrom; a mold box (14) including a mold surface (20) having a predetermined outer periphery (22) thereabout over which a plastic shell (21) is molded; positioning means for positioning either of said mold box (14) and powder box (12) between a neutral position wherein said opening (18) is displaced from said mold surface (20) and an operative position wherein said opening (18) and said mold surface (20) are positioned in proximity to each other; the improvement comprising an extendable sealing means (28) being disposed about said opening (18) for collapsing to a retracted position adjacent to said opening (18) and extending to an extended position in sealed engagement with said periphery (22) of said mold surface (20) and perfecting a sealed passageway between said opening (18) and said periphery (22) of said mold surface (20).

2. An apparatus (10) as set forth in claim 1 further comprising said extendable sealing means (28) including a bellows member (34) having first and second open ends (36,38) and a collapsible wall extending therebetween, said first end (36) of said bellows member (34) being in sealed connection with said powder box (12) about said opening (18), said second end (38) of said bellows member (34) including gasket means (42) operatively connected thereto for perfecting a seal against said periphery (22) of said mold surface (20) when in engagement therewith, said extendible sealing means further including extending means for extending and retracting said second end (38) of said bellows member (34) between said extended and retracted positions.

3. An apparatus (10) as set forth in claim 2 including a frame member (40) supporting said gasket means (42) and operatively connected to and completely about said second end (38) of said bellows member (34) for maintaining a predetermined shape of said bellows member (34) corresponding to said outer periphery (22) of said mold surface (20).

4. An apparatus (10) as set forth in claim 3 wherein said extending means includes at least one cylindrical housing (46) and a piston disposed within said housing (46) for hydraulically actuated reciprocating movement therethrough and a rod member (48) operatively connected to said piston and extending from said housing (46), said housing (46) being fixedly connected to said powder box (12) adjacent to said opening (18) and said rod member (48) being operatively connected to said second end (38) of said bellows member (34).

5. An apparatus (10) as set forth in claim 4 further including support means (30) for supporting said extendable sealing means (28), and said support means (30) including connecting means (32) for connecting said support means (30) about said opening (18) of said powder box (12).

6. A sealing apparatus (28) for perfecting a closed sealed chamber between an opening (18) of a powder box (12) and a periphery (22) of a mold surface (20) of a mold box (14), said sealing apparatus (28) comprising: support means (30) including connecting means (32) for connecting said support means (30) about the opening (18) of the powder box (12); and said sealing apparatus (28) being extendable and supported by said support means (30) for collapsing to a retracted position adjacent said support means (30) and extending to an extended position in sealed engagement with the periphery (22) of the mold surface (20) and perfecting a sealed passageway between the opening (18) of the powder box (12) and the periphery (22) of the mold surface (20).

* * * * *